Feb. 21, 1928.
C. E. REED
1,660,048
LATHE
Original Filed July 7, 1923   2 Sheets-Sheet 1
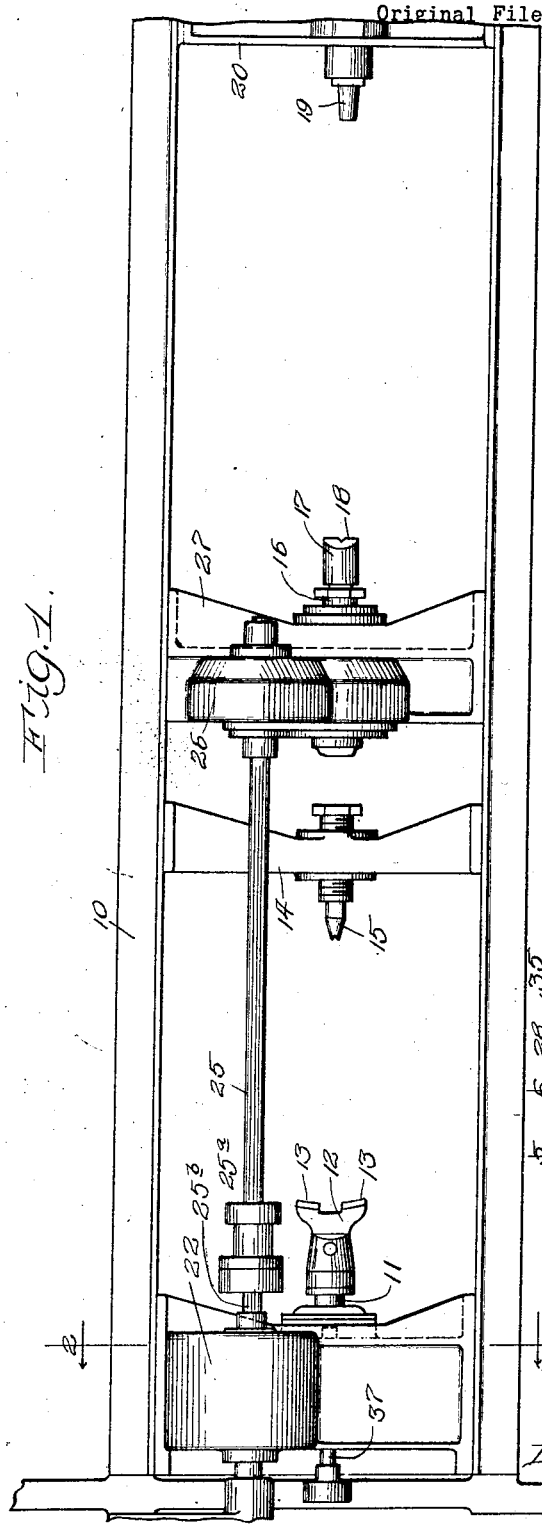
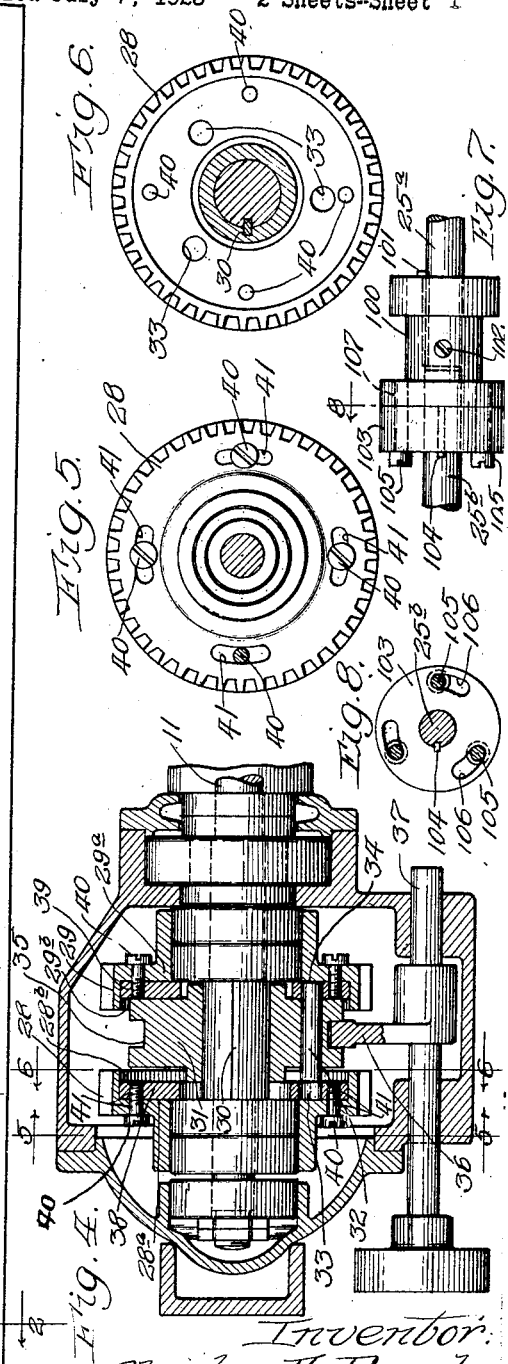
Inventor
Charles E. Reed, Feb. 21, 1928.
C. E. REED
1,660,048
LATHE
Original Filed July 7, 1923   2 Sheets-Sheet 2
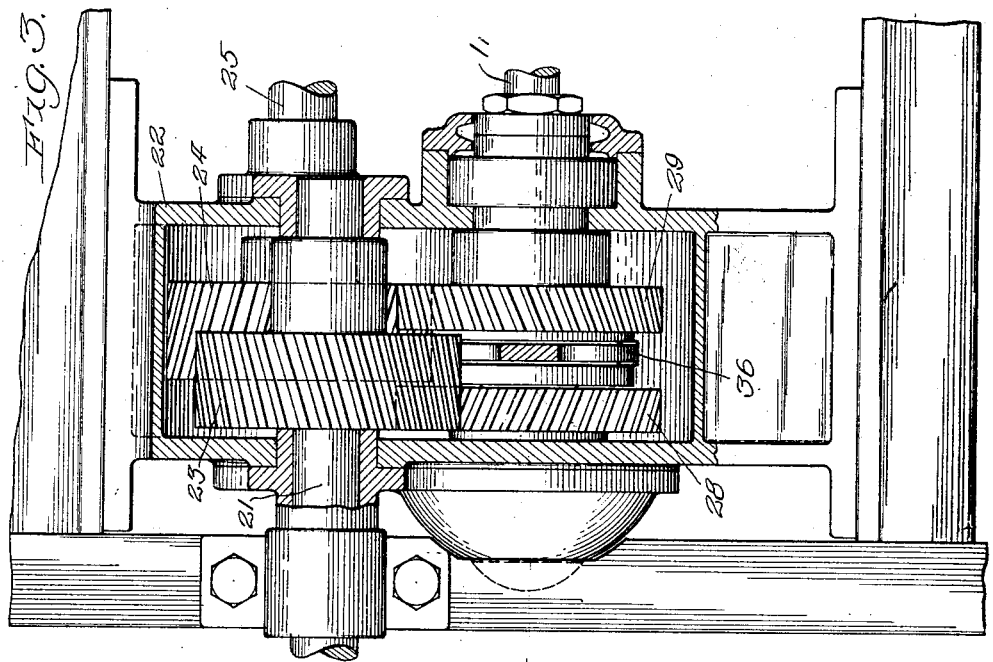
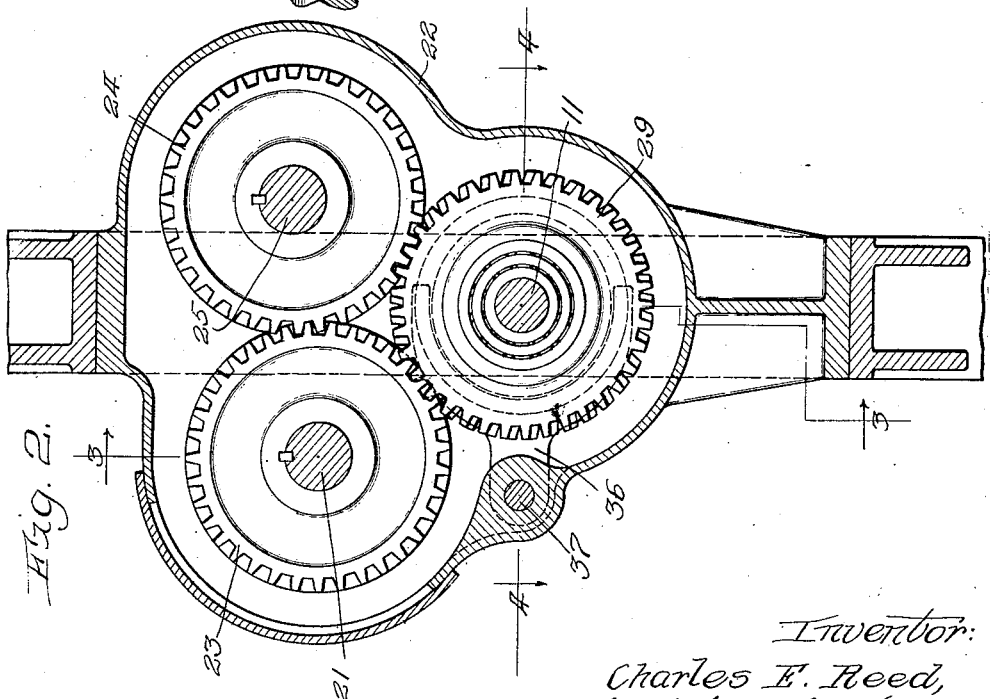
Inventor:
Charles E. Reed,
By Dyrenforth, Lee, Chritton & Wiles
Attys.

Patented Feb. 21, 1928.

1,660,048

UNITED STATES PATENT OFFICE.

CHARLES E. REED, OF McHENRY TOWNSHIP, McHENRY COUNTY, ILLINOIS.

LATHE.

Original application filed July 7, 1923, Serial No. 650,194. Divided and this application filed April 23, 1925. Serial No. 25,363.

My invention relates, as to one phase thereof, to mechanism adapted to operate a driven element in either direction, at will, and more especially to mechanism whereby one driven element may be operated in the same, or opposite directions, as another element driven from the same source of power. An example of a machine to which my invention is more especially applicable, is a last-turning lathe such, as for instance, of the type comprising a swing-frame on which the pattern and the work are rotatably mounted and the frame oscillates by virtue of the rotation of the pattern against a pattern follower, for the production of substantially accurate right and left lasts, whether graded or not, by the reversal of rotation of the pattern and the work, the right last being made by rotating the pattern and the work in the same direction and the left last being made by operating the pattern and work in opposite directions; the present application being a division of my pending application for United States Letters Patent, Serial No. 650,194, filed July 7, 1923.

One of my objects is to provide a reversing mechanism, for use more especially in connection with a copying lathe adapted for the manufacture of both right and left lasts from a single pattern, of such construction that lost motion between the gears will be minimized; and another object is to provide a reversing mechanism wherein shifting of the gears themselves is avoided.

As regards another phase of my invention, it may be stated that in lathes of the type above referred to the blank from which the last is to be formed is rotated by means of a dog on the work-driving spindle which is relatively long and narrow and in the turning of the last, the cutting mechanism, in its final operations, directly opposes the extremity of the dog which protrudes into the end of the work, the terminal end of the turned last, commonly the heel portion thereof, being turned down, in the last-forming operation, to a stub-portion which is relatively long and narrow, and to avoid interference between this dog and the cutting mechanism, this stub, in the turned last, should extend at its longest dimension substantially lengthwise of that portion of the dog which engages the turned last and midway between the opposite sides of the stub and substantially parallel therewith. It is thus necessary that the lathe be so conditioned before the last turning operation begins that the stub portion referred to on the turned last will extend relative to the last-dog, as stated, whether the last be a right or left one, this conditioning of the machine involving a certain predetermined positioning of the last-driving dog relative to the pattern, and also to the pattern-driving dog in those cases, as is usual, where a dog similar to the shape of the last-driving dog is employed.

In this connection, still another object of my invention is to provide a reversing mechanism in a last-turning lathe, which is so constructed that it cannot be manipulated for effecting rotation of the pattern and work in opposite directions, or in the same direction, unless the last-driving dog occupies the predetermined angular position relative to the pattern as above referred to, whereby damage to the cutting mechanism and the production of an imperfect last, by engagement of the cutting mechanism with the dog, is avoided.

Referring to the accompanying drawings:—

Figure 1 is a broken face view of the swinging frame portion of a copying lathe for producing lasts in accordance with a pattern comprising mechanism for rotating the pattern and the work, including reversing mechanism embodying my invention. Figure 2 is an enlarged section taken at the line 2—2 on Fig. 1 and viewed in the direction of the arrow, this section being taken through the reversing mechanism. Figure 3 is a broken section taken at the irregular line 3—3 on Fig. 2 and viewed in the direction of the arrows. Figure 4 is a plan section taken at the line 4—4 on Fig. 2 and viewed in the direction of the arrows. Figures 5 and 6 are sections taken at the lines 5 and 6 on Fig. 4, respectively, and viewed in the direction of the respective arrows. Figure 7 is a broken view in elevation of a sectional shaft forming a part of the machine; and Figure 8, a section taken at the line 8 on Fig. 7 and viewed in the direction of the arrow.

Inasmuch as I have devised my invention for embodiment in a machine of the general construction shown in my pending application above referred to, I have chosen to illustrate it in such a machine, but not, however, with the intention of limiting it to embodiment in such a construction.

As machines of the general construction shown, and above referred to, are commonly known, it will be sufficient to state that 10 represents a frame which, in accordance with common practice, is pivotally supported at its upper end on the frame work of the machine, to extend dependingly into a position in which it opposes the pattern follower and the last-cutting mechanism mounted on the frame work and commonly associated with pantographic grading mechanism for effecting the production of lasts of different sizes from a single pattern. The frame 10 forms the carrier, or support, for the last-pattern and the last-blank, both of which are rotatably supported in this frame and are operated, in accordance with the preferred embodiment of my invention, by the following described mechanism:

The frame 10 is provided with a pattern-driving spindle 11 terminating in a dog 12, its terminal portion, at which it engages the back of the heel portion of the pattern and presents alining teeth 13, being relatively long and narrow. The frame also carries a tail stock 14 presenting a spindle 15 for engaging the toe portion of the pattern, it being understood that the axes of the spindles 11 and 15 are in alinement and that the pattern is driven by rotating the spindle 11.

The frame 10 at its opposite end is provided with a driving spindle 16 presenting a dog portion 17 with its terminal portion, represented at 18, toothed and elongated as explained of the dog portion 12, and provided for engaging with, and driving, the blank from which the last is to be turned, the other end of this blank being supported on a stationary spindle 19 forming a portion of the tail stock 20 and also carried by the frame 10.

The drive for the spindles 11 and 16, in the particular arrangement shown, is through a shaft 21 journaled in a gear-case 22 carried by the frame 10. In the arrangement shown the shaft 21 is always driven in the same direction, any suitable means, such as those shown in my pending application above referred to, being provided for effecting the drive. The shaft 21 at the end thereof which extends into the casing 22 is provided with a spiral gear 23 located in said case and meshing with a spiral gear 24, also located in this case, and carried by a sectional shaft 25 which extends lengthwise of the frame 10. The shaft 25 is journaled in a gear case 26 secured to a cross-piece 27 of the frame 10, this shaft carrying a spiral gear (not shown) located in the case 26 and meshing with a spiral gear (not shown) also located in this case and rigidly connected to the driving spindle 16. The gear 23, which only partially overlaps the periphery of the gear 24, meshes with a spiral gear 28 journaled on the shaft 11 which is rotatably supported in the gear case 22, the shaft 11 also carrying a spiral gear 29, journaled thereon and meshing with the gear 24. Located between the gears 28 and 29 and splined on the shaft 11 as represented at 30, is a clutch-disk 31 provided with a series of pins 32 rigidly secured therein, each to extend beyond the opposite faces of the disk, these pins, which are grouped about the axis of the disk, being non-equidistantly spaced apart and adapted to enter correspondingly-disposed openings 33 and 34 in the sides of the gears 28 and 29, respectively. The parts just described are so proportioned and arranged that when the clutch-disk 31 which, it will be understood, rotates with the shaft 11, is moved either to its extreme position to the right or left in Fig. 4 for clutching with the gear 29 or 28, it is unclutched from the other thereof, this construction permitting of the driving of the shaft 11 from the gears 23 and 28 for rotating it in the same direction as the shaft 25, or driving it from the gears 23, 24 and 29, to rotate it reversely. The clutch-disk 31 is shown as preferably grooved, as represented at 35 to receive a yoke-shaped shifting device 36 mounted on a rod 37 slidably lengthwise in the gear-casing 22.

In the arrangement shown the gears 28 and 29 are formed of the main body portions $28^a$ and $29^a$, respectively, recessed at their inner faces as represented at $28^b$ and $29^b$, respectively, and rings 38 and 39, respectively, located in the said recesses and secured in place by set screws 40 which pass through the portions $28^a$ and $29^a$ and screw into threaded openings in the rings 38 and 39, the apertures 33 and 34, above referred to, being provided in these rings. The openings in the body portion $28^a$ and through which the set screws 40, holding the ring 38 in place, extend, are of elongated arc-shape as represented in Fig. 5 thereby permitting of relative adjustment between the ring 38 and the body portion $28^a$ of the gear 28, for a purpose herein described.

The shaft 25 is formed of two alining sections $25^a$ and $25^b$ coupled together by a coupling comprising a sleeve-like portion 100 keyed to the shaft-section $25^a$, as represented at 101, a set-screw 102 securing the sleeve 100 against movement relative to this shaft-section. The coupling also comprises a collar 103 keyed to the shaft section $25^b$ as shown at 104. The coupling sections 100 and 103 are relatively adjustable about their axes, to permit of the relative adjustment of the shaft-sections about their axes, the means shown comprising a series of clamping screws 105 which extend at their threaded ends through arc-shaped slots 106 in the collar 103 and screw into openings 107 in the flanged portion 108 of the sleeve 100, it being understood from the foregoing that upon loosening the screws 105 the sections of the collar may be relatively rotated with the shaft-sections with which they are connected and these parts be held in relatively adjusted position by tightening the screws 105.

In connection with the use of machines of the swinging-frame type it has been found in practice, in order that the stub turned on the last extend lengthwise of the portion of the dog holding this end of the last, in the turning of a reverse last, as for example the turning of a left-hand last from a right-hand pattern and which involves rotation of the spindles 11 and 16 in opposite directions, that the dogs for the pattern and blank should occupy a predetermined angular position to the vertical upon positioning the blank in the machine, namely, be tipped backwardly at their upper portions and forwardly at their lower portions. This angle where the parts of the machine are proportioned and arranged substantially as shown, should be approximately 7°, but will be varied according to the varying of the proportions of certain parts of the machine. To ensure such positioning of the dogs before the turning operation begins, the various parts of the machine are adjusted, to such positions that the clutch mechanism for the gears 28 and 29 cannot be operatively connected with the gear 29 unless these dogs occupy such predetermined position.

In the assembling of the parts of the machine the clutch is assembled with the pins 32 extending into the openings 34 in the disk 39, this disk being rigidly secured to the gear 29 by its screws 40. The spindle 11 is then rotated to a position in which the dog 12 inclines rearwardly 7° as hereinbefore stated. The disk 38 is then rotatably adjusted on the gear 28 to a position in which the openings 33 in the disk 38 extend in alinement with the respective pins 32 of the clutch to receive these pins when the clutch is shifted to the left in Fig. 4 and the screws 40 then tightened and if desired the disk 38 pinned, in adjusted position, to the gear 28. The coupling between the shaft-sections 25ᵃ and 25ᵇ is then loosened and the shaft-section 25ᵃ rotated to cause the dog 17 to incline rearwardly 7° as hereinbefore stated and the clamping screws 105 then tightened. As gears 28 and 29 rotate in opposite directions clutch disk 31 can only be shifted when the dogs and gearing are at rest and then only when the dog has been turned approximately 7° with reference to the disk 38 or 39 with which it is to be engaged from its working strain position in the same direction as its previous rotation while the lathe was at work and the clutch then shifted to reverse the rotation of the dog.

As will be understood from the foregoing, the reversing gearing provided for the purpose of adapting the machine for the making of both right and left lasts from a single pattern permits of the turning of either right or left lasts without requiring that the pattern be disturbed, and without requiring the shifting of the gears themselves.

The feature of forming the reversing mechanism of spiral gears is of great advantage, especially in a last-turning machine as lost motion between the gears, which is particularly objectionable in a last-turning machine for producing both right and left lasts from a single pattern, is eliminated, it being an established fact that in the operation of lathes of this character there is a certain amount of back-lash when the tool strikes the work.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. In a last-turning lathe, the combination of a support, means on said support, involving rotatable pattern and work supporting dogs, and means for driving said dogs in the same direction or in opposite directions, at will, comprising intermeshing gears, clutching means cooperating with said gears to drive one of said dogs in either direction and movable into position for driving said last-referred-to dog, only when said dogs extend at a predetermined angle to the vertical to drive said last-referred-to dog in reverse direction, the one of said gears which is driven by the clutch to drive said last-referred-to dog in reverse direction being formed in sections one of which carries the teeth of the gear and the other the portion which interlocks with said clutching means, a sectional shaft the sections of which are relatively adjustable angularly about their axes, and means operatively connecting said shaft sections together in adjusted position.

2. In a last-turning lathe, the combination of a support, means on said support, involving rotatable pattern and work supporting dogs, and means for driving said dogs in the same direction or in opposite directions, at will, comprising intermeshing gears, clutching means cooperating with said gears to drive one of said dogs in either direction and movable into position for driving said last-referred-to dog, only in a predetermined angular position of the gear engaged by said clutching means to drive said last-referred-to dog in reverse direction, said last-referred-to gear being formed in sections one of which carries the teeth of the gear and the other the portion which interlocks with said clutching means, a sectional shaft the sections of which are relatively adjustable angularly about their axes and means operatively connecting said shaft sections together in adjusted position.

3. In a last-turning lathe, the combination of a support, means on said support involving rotatable pattern and work supporting dogs, and means for driving said dogs in the same direction or in opposite directions, at will, comprising intermeshing spiral gears, clutching means cooperating with said gears to drive one of said dogs in either direction and movable into position for driving said last-referred-to dog, only in a single predetermined angular position of the gear engaged by said clutching means to drive said last-referred-to dog in reverse direction, said last referred to gear being formed in sections one of which carries the teeth of the gear and the other the portion which interlocks with said clutching means, a sectional shaft the sections of which are relatively adjustable angularly about their axes and means operatively connecting said shaft sections together in adjusted position.

CHARLES E. REED.